United States Patent
Jo et al.

(10) Patent No.: US 12,235,731 B2
(45) Date of Patent: Feb. 25, 2025

(54) COMPUTING SYSTEM PERFORMING IMAGE BACKUP AND IMAGE BACKUP METHOD

(71) Applicant: SAMSUNG ELECTRONICS CO., LTD., Suwon-si (KR)

(72) Inventors: Insoon Jo, Hwaseongi-si (KR); Jooyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 397 days.

(21) Appl. No.: 16/878,696

(22) Filed: May 20, 2020

(65) Prior Publication Data

US 2021/0110201 A1  Apr. 15, 2021

(30) Foreign Application Priority Data

Oct. 10, 2019  (KR) .................. 10-2019-0125681

(51) Int. Cl.
| | |
|---|---|
| *G06F 21/00* | (2013.01) |
| *G06F 11/14* | (2006.01) |
| *G06F 18/22* | (2023.01) |
| *H04L 9/32* | (2006.01) |

(52) U.S. Cl.
CPC .......... *G06F 11/1453* (2013.01); *G06F 18/22* (2023.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 7,636,824 B1 * | 12/2009 | Tormasov | ........... | G06F 11/1451 711/216 |
| 7,797,323 B1 * | 9/2010 | Eshghi | ................ | G06F 16/1748 707/747 |
| 8,782,077 B1 * | 7/2014 | Rowley | ................ | G06F 16/951 707/769 |

(Continued)

FOREIGN PATENT DOCUMENTS

| | | |
|---|---|---|
| JP | 2008-178013 A | 7/2008 |
| JP | 5739079 B1 | 6/2015 |

(Continued)

OTHER PUBLICATIONS

Communication dated Nov. 6, 2020, from the European Patent Office in counterpart European Application No. 20177140.9.

*Primary Examiner* — Eleni A Shiferaw
*Assistant Examiner* — Hassan A Hussein
(74) *Attorney, Agent, or Firm* — Sughrue Mion, PLLC

(57) ABSTRACT

An image backup method of a computing system including a host and a memory system includes receiving, by the host, a first image, together with a backup request, performing, by the host, a similarity determination between the first image and images stored in the memory system, based on a first hash function, selectively providing, by the host, the first image to the memory system according to a result of the similarity determination, performing, by the memory system, an identity determination between the first image and the images, based on a second hash function, and providing, by the memory system, the host with information for determining a storage method of the first image according to a result of the identity determination.

18 Claims, 10 Drawing Sheets

(56) References Cited

U.S. PATENT DOCUMENTS

| | | | |
|---|---|---|---|
| 9,104,687 B2* | 8/2015 | Euresti | G06F 16/174 |
| 9,569,213 B1* | 2/2017 | Brandt | G06Q 10/06 |
| 9,626,596 B1* | 4/2017 | Suman | G06K 9/6215 |
| 10,203,905 B2* | 2/2019 | Neporada | G06F 3/0605 |
| 10,289,937 B2* | 5/2019 | Prasad | G06F 16/51 |
| 10,361,866 B1* | 7/2019 | McGregor | H04L 9/0637 |
| 10,452,828 B1* | 10/2019 | Larimer | H04L 9/3239 |
| 10,904,286 B1* | 1/2021 | Liu | H04L 63/0245 |
| 10,977,528 B1* | 4/2021 | Tong | G06F 18/22 |
| 11,113,237 B1* | 9/2021 | Visvanathan | G06F 16/137 |
| 2007/0239756 A1* | 10/2007 | Li | G06F 16/951 707/999.102 |
| 2008/0091725 A1* | 4/2008 | Hwang | G06F 16/2255 |
| 2009/0022358 A1* | 1/2009 | Tian | H04N 1/32283 348/222.1 |
| 2009/0034847 A1* | 2/2009 | Hirohata | H04N 1/00843 382/190 |
| 2009/0034848 A1* | 2/2009 | Sakamoto | G06V 30/18076 382/195 |
| 2009/0086232 A1* | 4/2009 | Ohira | H04N 1/444 358/1.9 |
| 2009/0087098 A1* | 4/2009 | Ohira | G06F 16/532 382/209 |
| 2011/0235908 A1* | 9/2011 | Ke | G06V 10/751 382/218 |
| 2013/0036300 A1* | 2/2013 | Baik | G06F 9/4401 713/2 |
| 2013/0042097 A1* | 2/2013 | Baik | G06F 9/4401 713/2 |
| 2013/0042098 A1* | 2/2013 | Baik | G06F 9/445 713/2 |
| 2013/0151759 A1* | 6/2013 | Shim | G06F 3/0641 711/E12.008 |
| 2013/0279806 A1* | 10/2013 | Tonisson | G06F 16/56 382/173 |
| 2013/0339307 A1* | 12/2013 | Berstler | G06F 11/1453 707/654 |
| 2014/0016872 A1* | 1/2014 | Chao | G06F 16/50 382/218 |
| 2014/0081926 A1* | 3/2014 | Adams | G06F 16/51 707/692 |
| 2014/0181057 A1* | 6/2014 | Euresti | G06F 16/174 707/698 |
| 2014/0226906 A1* | 8/2014 | Kang | G06V 10/462 382/197 |
| 2014/0236963 A1* | 8/2014 | Drake | G06T 7/12 707/747 |
| 2014/0279933 A1* | 9/2014 | Blasko | G06F 16/174 707/687 |
| 2014/0358872 A1* | 12/2014 | Shin | G06F 16/1748 707/692 |
| 2015/0026132 A1* | 1/2015 | Arnaudov | G06F 16/128 707/639 |
| 2015/0161121 A1* | 6/2015 | Alvarez | G06F 16/2255 707/698 |
| 2015/0281081 A1* | 10/2015 | Rajahalme | H04L 45/7453 370/392 |
| 2015/0317325 A1* | 11/2015 | Key | G06F 21/564 707/770 |
| 2015/0358499 A1* | 12/2015 | Sasaki | H04N 1/00244 358/1.15 |
| 2016/0117061 A1* | 4/2016 | Hodgart | G09G 5/003 715/733 |
| 2016/0196478 A1* | 7/2016 | Choi | G06V 10/36 382/218 |
| 2017/0142479 A1* | 5/2017 | Babbar | G06F 16/71 |
| 2017/0177867 A1* | 6/2017 | Crofton | G06F 21/565 |
| 2017/0193329 A1* | 7/2017 | Suman | G06F 16/583 |
| 2018/0052682 A1* | 2/2018 | Fox | G06F 8/71 |
| 2018/0107689 A1* | 4/2018 | Grossman | G06F 16/51 |
| 2018/0218755 A1* | 8/2018 | Kawaguchi | G06F 18/22 |
| 2018/0232388 A1* | 8/2018 | Burns | H04L 67/1097 |
| 2018/0239784 A1* | 8/2018 | Solli | G06F 16/583 |
| 2018/0276778 A1* | 9/2018 | Kim | G06F 16/00 |
| 2018/0373894 A1* | 12/2018 | Kim | H04L 9/3242 |
| 2019/0065832 A1* | 2/2019 | Ratnakaram | G06V 20/30 |
| 2019/0109834 A1* | 4/2019 | Lyons | H04L 63/08 |
| 2019/0188184 A1* | 6/2019 | Chittaro | G06F 16/152 |
| 2019/0190698 A1* | 6/2019 | Nuzzi | H04L 9/3247 |
| 2019/0236371 A1* | 8/2019 | Boonmee | G06V 10/764 |
| 2019/0325040 A1* | 10/2019 | Sagi | G06F 16/1748 |
| 2019/0377971 A1* | 12/2019 | Song | G06V 10/761 |
| 2020/0073959 A1* | 3/2020 | Tian | G06N 7/023 |
| 2020/0104632 A1* | 4/2020 | Liu | G06N 3/08 |
| 2020/0162236 A1* | 5/2020 | Miller | G06F 40/174 |
| 2020/0162266 A1* | 5/2020 | Miller | H04L 9/3236 |
| 2020/0210763 A1* | 7/2020 | Lin | G06V 10/764 |
| 2020/0301961 A1* | 9/2020 | Huang | G06F 16/9014 |
| 2020/0327017 A1* | 10/2020 | Vijayan | G06F 11/1451 |
| 2020/0409988 A1* | 12/2020 | Singh | G06F 16/583 |
| 2021/0026883 A1* | 1/2021 | Xu | G06F 16/532 |
| 2021/0110201 A1* | 4/2021 | Jo | H04L 9/3239 |
| 2022/0066991 A1* | 3/2022 | Sharma | G06F 11/327 |

FOREIGN PATENT DOCUMENTS

| | | |
|---|---|---|
| JP | 6005951 B2 | 10/2016 |
| WO | 2019174414 A1 | 9/2019 |

* cited by examiner

COMPUTING SYSTEM PERFORMING IMAGE BACKUP AND IMAGE BACKUP METHOD

CROSS-REFERENCE TO RELATED APPLICATION

This application claims priority from Korean Patent Application No. 10-2019-0125681, filed on Oct. 10, 2019, in the Korean Intellectual Property Office, the disclosure of which is incorporated by reference herein in its entirety.

BACKGROUND

1. Field

The present disclosure relates to a computing system and an image backup method, and more particularly, to a computing system and an image backup method for performing image backup by using two types of hash functions.

2. Description of Related Art

Related art file backup mainly targets document backup, and determines whether to perform backup by checking changes between an original file and a file requested for backup in a specified unit such as by file or by block. Such a backup method is difficult to apply to images.

SUMMARY

It is an aspect to provide a computing system and an image backup method, which improve storage space efficiency and reduce an amount of calculation by performing image backup by using two types of hash functions.

According to an aspect of an embodiment, there is provided an image backup method of a computing system including a host and a memory system, the image backup method including receiving, by the host, a first image, together with a backup request, performing, by the host, a similarity determination between the first image and a plurality of images stored in the memory system, based on a first hash function, selectively providing, by the host, the first image to the memory system according to a result of the similarity determination, performing, by the memory system, an identity determination between the first image and the plurality of images, based on a second hash function, and providing, by the memory system, the host with information for determining a storage method of the first image according to a result of the identity determination.

According to another aspect of an embodiment, there is provided a computing system including a host and a memory system configured to store a plurality of images, wherein the host is configured to calculate a first hash value of a first image by applying a first hash function to the first image, perform a similarity determination between the first image and the plurality of images by comparing the calculated first hash value with first hash values of the plurality of images, and provide the first image to the memory system based on a result of the similarity determination, and the memory system is configured to calculate a second hash function of the first image by applying a second hash function to the first image, perform an identity determination between the first image and the plurality of images by comparing the calculated second hash value with second hash values of the plurality of images, and provide the host with information for determining a storage method of the first image based on a result of the identity determination.

According to another aspect of an embodiment, there is provided a memory system comprising a memory device configured to store a plurality of images; and a memory controller configured to perform a similarity determination between a first image that is received from a host and is to be backed up and the plurality of images based on a first hash function, perform an identity determination between the first image and the plurality of images based on a second hash function, and provide results of the similarity determination and the identity determination to the host.

BRIEF DESCRIPTION OF THE DRAWINGS

Various embodiments will be more clearly understood from the following detailed description taken in conjunction with the accompanying drawings, in which.

DETAILED DESCRIPTION

Related art backup methods may determine identity between images but not similarity between the images. Therefore, the related art backup methods recognize images, such as rotated images, color corrected images, and images taken by continuous shooting, as completely different images, and newly store all the images, thereby requiring a lot of storage space. In addition, in the case of document backup, since the related art backup methods operate under the assumption that a single original is known, an amount of calculation is not huge. However, in the case of an image backup, there may be a large number of originals as comparison targets, and an amount of calculation required to check changes increases in proportion to the number of the originals.

Various example embodiments described herein relate to a computing system and an image backup method, which improve storage space efficiency and reduce an amount of calculation by performing image backup by using two types of hash function.

Figure 1:
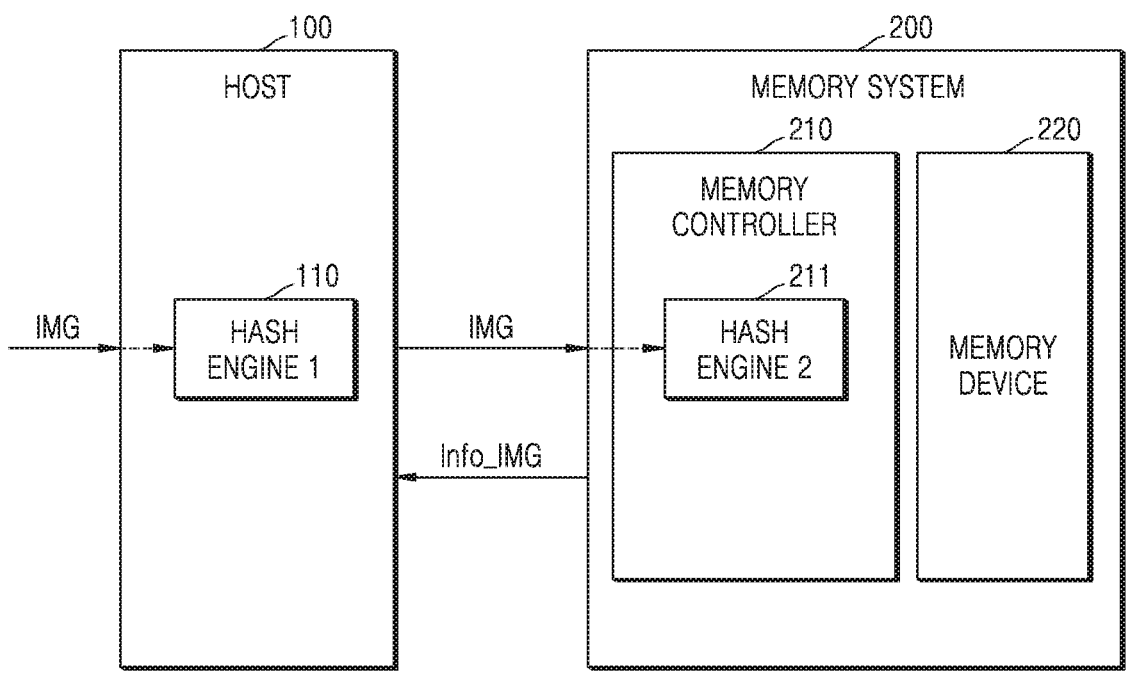
FIG. 1 is a block diagram of a computing system according to an embodiment.

FIG. 1 is a block diagram of a computing system 10 according to an embodiment.

Referring to FIG. 1, the computing system 10 may include a host 100 and a memory system 200. In addition, the memory system 200 may include a memory controller 210 and a memory device 220. In addition, according to an embodiment, the host 100 may include a first hash engine (Hash Engine 1) 110, and the memory controller 210 may include a second hash engine (Hash Engine 2) 211. Although FIG. 1 illustrates that the second hash engine 211 is provided in the memory controller 210, embodiments are not limited thereto. As an example, the second hash engine 211 may be stored in a memory (e.g., DRAM) arranged outside the memory controller 210 in the memory system 200.

The computing system 10 may be various types of systems equipped with the memory system 200 for storing data. As an example, the computing system 10 may correspond to various types of systems such as a server device, a computer, a net-book, a web tablet, a wireless phone, a mobile phone, a smart phone, an e-book, a navigation device, a digital camera, a wearable device, an internet of thing (IoT) device, an internet of everything (IoE) device, a virtual reality device, and an augmented reality device.

The host 100 may perform a data management operation in the computing system 10. For example, the host 100 may provide a write request or read request to the memory system 200, and the memory system 200 may write data to the memory device 220 or read data from the memory device 220 to provide the read data to the host 100, according to the request from the host 100. In addition, in response to a data erase request from the host 100, the memory system 200 may perform an erase operation on data in an area indicated by the host 100.

The memory system 200 may include one or more storage media. As an example, the memory system 200 may include one or more solid state drives (SSDs) or the like. When the memory system 200 includes an SSD, the memory system 200 may include a plurality of memory chips. As an example, the memory system 200 may include a plurality of flash memory chips (e.g., NAND memory chips) that non-volatilely store data.

Alternatively, the memory system 200 may correspond to one flash memory chip. Alternatively, the memory system 200 may correspond to a memory card including one or more flash memory chips.

According to an embodiment, the computing system 10 may support an image backup function. The computing system 10 may determine whether a target image requested for backup is identical or similar to at least one of a plurality of images stored in the memory system 200. When the computing system 10 identifies an image identical to the target image, the computing system 10 may not store the target image. In addition, when the computing system 10 identifies an image similar to the target image, the computing system 10 may store data corresponding to a difference between the target image and the similar image in the memory system 200. When the computing system 10 does not identify that an image is identical or similar to the target image, the computing system 10 may store the entire target image in the memory system 200. Accordingly, the storage space of the memory system 200 may be efficiently used.

An operation example related to image backup according to an embodiment will be described in detail as follows.

The host 100 may receive an image backup (or image upload) request and a target image IMG of the backup request from the outside of the host 100. In some embodiments, the host 100 may receive an image backup request and a target image IMG of the backup request from the outside of the computing system 10. The host 100 may primarily determine whether the target image IMG is similar to a plurality of images stored in the memory device 220, based on hash values. As an example, the host 100 may calculate a first hash value of the target image IMG by using the first hash engine 110, and may determine whether the target image IMG is similar to the plurality of images by comparing the calculated first hash value with first hash values of the plurality of images.

The first hash engine 110 may generate a hash value of an input image by applying a hash function to the input image. In this case, the first hash engine 110 may use a perceptual hash function (or algorithm). The first hash engine 110 to which the perceptual hash function is applied may output different hash values for input values that are not similar to each other, but may output similar hash values for similar input values. According to an embodiment, the first hash engine 110 to which the perceptual hash function is applied may output the same hash values with respect to input values having a certain similarity level of above. As described above, the perceptual hash function may be used to determine the similarity between the target image IMG and the plurality of images stored in the memory system 200. Hereinafter, for convenience of description, a hash value calculated by using a perceptual hash function is referred to as a first hash value. A more detailed description of the first hash engine 110 will be described later with reference to FIG. 2.

As described above, when the target image IMG is different from the plurality of images stored in the memory system 200, the first hash engine 110 may output, as the first hash value of the target image IMG, a hash value different from each of the first hash values of the plurality of images. Therefore, in this case, the host 100 may not identify a hash value that is the same as or similar to the first hash value of the target image IMG among the first hash values of the plurality of images. That is, the host 100 may determine that an image that is identical or similar to the target image IMG is not already stored in the memory device 220. Accordingly, the host 100 may store the entire target image IMG in the memory device 220.

On the other hand, when the target image IMG is identical or similar to a certain image among the plurality of images, the first hash engine 110 may output, as the first hash value of the target image IMG, a hash value that is the same as or similar to a first hash value corresponding to the certain image. Accordingly, the host 100 may determine that the first hash value of the target image IMG and the first hash value of the certain image are the same or similar to each other. That is, the host 100 may determine that an image identical or similar to the target image IMG is already stored in the memory device 220.

Even if the host 100 has determined that a certain image, which is identical or similar to the target image IMG, is already stored in the memory device 220 as described above, the host 100 additionally checks whether the target image IMG is identical to the certain image. This is because the storage of the target image IMG is unnecessary when the target image IMG and the certain image are identical to each other. Accordingly, the host 100 may provide the target image IMG to the memory controller 210 to determine whether there is an image identical to the target image IMG, and may request a determination of the identity of the target image IMG.

The memory controller 210 may receive the target image IMG, which has been determined by the host 100 to be identical or similar to the certain image among the plurality of images already stored in the memory device 220, from the host 100. The memory controller 210 may secondarily determine whether the target image IMG is identical to the plurality of images stored in the memory device 220, based on the hash values according to the request of the host 100. As an example, the memory controller 210 may calculate a second hash value of the target image IMG by using the second hash engine 211, and may determine whether the target image IMG is identical to the plurality of images by comparing the calculated second hash value with second hash values of the plurality of images. The memory controller 210 may provide the host 100 with information Info_IMG indicating a result of the determination.

The second hash engine 211 may generate a hash value of an input image by applying a hash function to the input image. In this case, the second hash engine 211 may use a cryptographic hash function (or algorithm). The cryptographic hash function has a feature in which it is difficult to find a relationship between input values from hash values. That is, the second hash engine 211 to which the cryptographic hash function is applied may output completely different hash values even when similar input values are input, and may output the same hash values only when the same input values are input. As above, the cryptographic hash function may be used to determine the identity between images. Hereinafter, for convenience of description, a hash value calculated by using the cryptographic hash function will be referred to as a second hash value. A more detailed description of the second hash engine 211 will be described later with reference to FIG. 2.

The first hash engine 110 and the second hash engine 211 may be variously implemented. For example, each of the first hash engine 110 and the second hash engine 211 may include a computing circuit implemented in hardware. Alternatively, the first hash engine 110 and the second hash engine 211 may be implemented in software executed by at least one processor. In some embodiments, the processor may be a microprocessor or a central processing unit (CPU), etc.

As described above, the second hash engine 211 may receive the target image IMG from the host 100 and generate the second hash value applying the second hash function to the input target image IMG. When the target image IMG is not identical to the plurality of images that are already stored in the memory device 220, the second hash engine 211 may output, as the second hash value of the target image IMG, a hash value different from the second hash values of the plurality of images. Therefore, the memory controller 210 may not identify the same hash value as the second hash value of the target image IMG among the second hash values of the plurality of images. That is, the memory controller 210 may determine that an image identical to the target image IMG is not already stored in the memory device 220.

In this case, since the memory controller 210 receives the target image IMG from the host 100 on the premise that there is an image identical or similar to the target image IMG from among the plurality of images, the memory controller 210 may determine that there is no image identical to the target image IMG but there is an image similar to the target image IMG. Therefore, the memory controller 210 may provide the host 100 with information Info_IMG indicating that there is an image already stored in the memory device 220 that is similar to the target image IMG.

On the other hand, when the target image IMG is identical to a certain image among the plurality of images that are already stored in the memory device 220 (it is noted that the certain image here may be the same as or different from the certain image identified by the first hash engine 110), the second hash engine 211 may output, as the second hash value of the target image IMG, a hash value that is the same as a second hash value that is output when the certain image is input. In other words, the second hash value of the target image IMG and the second hash value of the image are the same and the second hash value may be output by the second hash engine 211. Therefore, the memory controller 210 may determine that the second hash value of the target image IMG and the second hash value of the certain image are the same. That is, the memory controller 210 may determine that an image identical to the target image IMG is already stored in the memory device 220. Accordingly, the memory controller 210 may provide the host 100 with information Info_IMG indicating that there is an image identical to the target image IMG.

According to another embodiment, the host 100 may provide the target image IMG to the memory controller 210, and may provide the memory controller 210 with a result of the similarity determination performed by the host 100 (i.e., by the first hash engine 110) while requesting the identity determination. For example, the host 100 may provide the memory controller 210 with information (e.g., a logical address, a name, etc.) about an image having a first hash value that is similar to that of the target image IMG. The memory controller 210 may identify a second hash value of the image having the similar first hash value based on the information about the image having the similar first hash value, the information being received from the host 100, and may perform identity determination by comparing the identified second hash value with the second hash value of the target image IMG. In other words, in this embodiment, the memory controller 210 may only evaluate, using the second hash engine 211, the certain image previously identified by the first hash engine 110 as being identical or similar to the target image IMG. By performing the identity determination only on the certain image previously identified as being identical or similar to the target image IMG, the memory controller 210 may check the presence of an image identical to the target image IMG without comparing the second hash value of the target image IMG with all of the second hash values of the plurality of images, and therefore, an amount of calculation may be reduced.

The host 100 may store at least a portion of the target image IMG in the memory device 220 based on the information Info_IMG received from the memory controller 210. For example, when information Info_IMG, which indicates that there is an image similar to the target image IMG from among the plurality of images already stored in the memory device 220, is received, the host 100 may store, in the memory device 220, data corresponding to a difference between the similar image and the target image IMG. In addition, when information Info_IMG, which indicates that there is an image identical to the target image IMG from among the plurality of images stored in the memory device 220, is received, the host 100 may determine not to store the target image IMG in the memory device 220.

According to the above embodiments, the computing system 10 may determine and backup the identity and similarity between the target image IMG requested for backup and a plurality of pre-stored images. Accordingly, the computing system 10 may increase the efficiency of a storage space as compared to a backup method of storing the target image IMG when there is no image identical to the target image IMG by determining only the identity. In addition, since the computing system 10 determines the identity and similarity between images by using hashes, an amount of calculation may be drastically reduced compared to the case of determining the identity by comparing pixel values of the images.

In addition, according to the above embodiments, the computing system 10 may perform the determination of the identity and similarity between the target image IMG and the plurality of pre-stored images through a division of labor between the host 100 and the memory system 200. That is, the host 100 may determine similarity by using the perceptual hash function, and the memory controller 210 may determine identity by using the cryptographic hash function that requires a more complicated calculation than the perceptual hash function. Accordingly, a bottleneck of calculation processing, which may occur when either the host 100 or the memory system 200 performs both identity determination and similarity determination, may be prevented.

Figure 2:
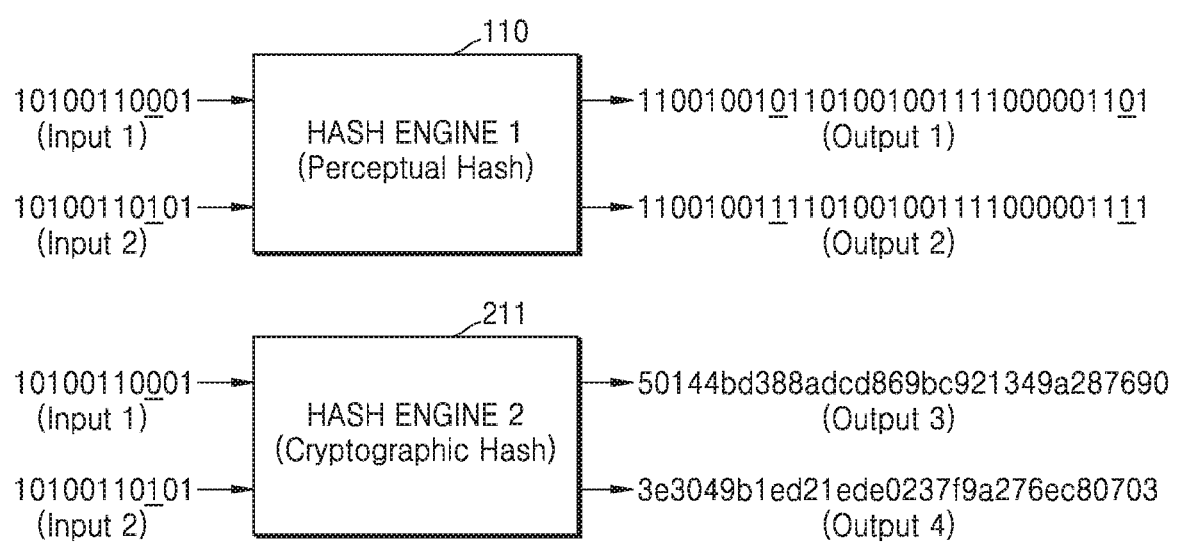
FIG. 2 is a block diagram of a hash engine according to an embodiment.

FIG. 2 is a block diagram of a hash engine according to an embodiment.

Referring to FIGS. 1 and 2, a first input value (Input 1) 10100110001 and a second input value (Input 2) 10100110101 may be input to each of the first hash engine 110 using the perceptual hash function and the second hash engine 211 using the cryptographic hash function.

First, the first hash engine 110 using the perceptual hash function outputs the same or similar hash values when similar input values are input. Therefore, when the first input value and the second input value, which differ from each other by only one bit, are input to the first hash engine 110, the first hash engine 110 may generate a first output value (Output 1) 11001001011010010011111000001101 and a second output value (Output 2) 11001001111010010011111000001111, which have similar hash values. It may be checked that the first output value and the second output value respectively have hash values between which only two bits out of 32 bits in total are different.

Although it has been illustrated and described with reference to FIG. 2 that two bits of the first output value (Output 1) are different from corresponding two bits of the second output value (Output 2), the first hash engine 110 according to some embodiments may generate a first output value and a second output value, which have the same hash value. The perceptual hash function may correspond to one selected from a block mean value based (BMB) hash, a discrete cosine transform (DCT) hash, a discrete wavelet transform (DWT) hash, a principal component analysis (PCA) hash, a Marr-Hilderth operator based (MH) hash, and a radial variance based (RADIAL) hash. However, these are only examples, and embodiments are not limited to these examples.

The second hash engine 211 using the cryptographic hash function outputs different hash values even when similar input values are input. Therefore, even though the first input value (Input 1) and the second input value (Input 2), which differ from each other by only one bit, are input to the second hash engine 211, the second hash engine 211 may generate a third output value (Output 3) 50144bd388adcd869bc921349a287690 and a fourth output value (Output 4) 3e3049b1ed21ede0237f9a276ec80703, which have unassociated hash values. It may be checked that the third output value and the fourth output value do not have bits which are associated therebetween from among 32 bits in total. As such, the second hash engine 211 may generate hash values that are not associated with each other even when input values, which are different in only one bit of all bits, are input. The cryptographic hash function may correspond to one selected from OST, HAVAL, MD2, MD4, MD5, PANAMA, RadioGatun, RIPEMD, RIPEMD-128/256, RIPEMD-160, RIPEMD-320, SHA-0, SHA-1, SHA-256/224, SHA-512/384, SHA-3, and WHIRLPOOL. However, these are only examples, and embodiments are not limited to these examples.

Although it has been illustrated and described with reference to FIG. 2 that the first hash engine 110 and the second hash engine 211 output hash values of 32 bits, embodiments are not limited thereto. As an example, the first hash engine 110 and the second hash engine 211 may output a hash value having a larger number of bits, such as 64 bits or 128 bits, or a hash value having a smaller number of bits, such as 16 bits. As the number of bits of the hash value increases, operations performed in the hash engine may become more complicated.

Figure 3:
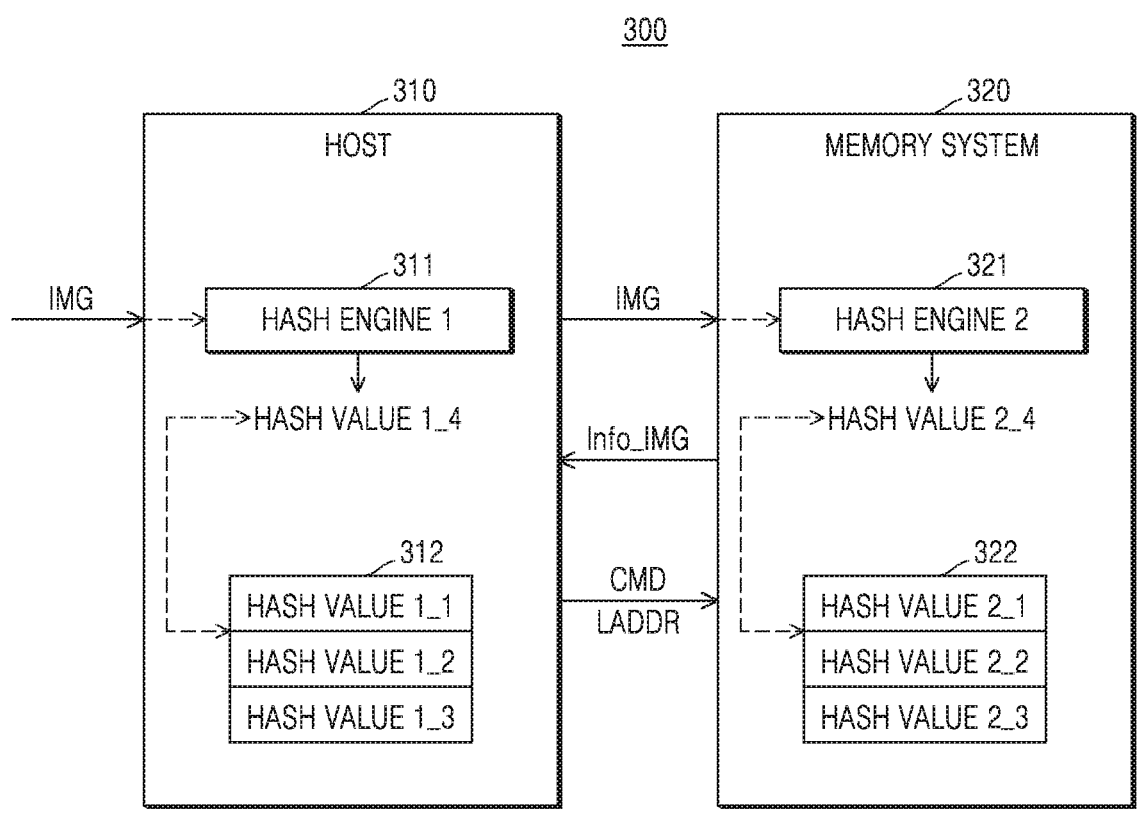
FIG. 3 is a block diagram illustrating a detailed implementation of a computing system according to an embodiment.

FIG. 3 is a block diagram illustrating a detailed implementation of a computing system 300 according to an embodiment.

Referring to FIG. 3, the computing system 300 may include a host 310 and a memory system 320. In addition, the host 310 may include a first hash table 312 and a first hash engine (Hash Engine 1) 311. The first hash table 312 may store a plurality of first hash values Hash Value 1_1, Hash Value 1_2, and Hash Value 1_3 that correspond respectively to the plurality of images that are already stored in the memory system 320. In addition, the memory system 320 may include a second hash table 322 and a second hash engine (Hash Engine 2) 321, and may store a plurality of images. The second hash table 322 may store a plurality of second hash values Hash Value 2_1, Hash Value 2_2, and Hash Value 2_3 that correspond respectively to the plurality of images that are already stored in the memory system 320. The host 310 may receive a target image IMG requested for backup from the outside of the host 310. In some embodiments, the host 310 may receive the target image IMG for backup from outside of the computing system 300. The host 310 may calculate a first hash value Hash Value 1_4 of the target image IMG by using the first hash engine 311, and may compare the calculated first hash value Hash Value 1_4 with first hash values Hash Value 1_1, Hash Value 1_2, and Hash Value 1_3 of a plurality of pre-stored images by using the first hash table 312.

While the example shown in FIG. 3 illustrates only three first hash values stored in the first hash table 312, the first hash table 312 may include first hash values of each of the plurality of images that are already stored in the memory system 320. The first hash values of each of the plurality of images may be generated from the first hash engine 311 by inputting each of the plurality of images to the first hash engine 311. The first hash table 312 may be stored in the host 310. As an example, the host 310 may include a memory (not shown), and the first hash table 312 may be stored in the memory.

In an embodiment, the host 310 may compare the calculated first hash value Hash Value 1_4 with each of the first hash values Hash Value 1_1, Hash Value 1_2, and Hash Value 1_3 of the plurality of images to check the number of different bits therebetween.

When there is no case where the number of different bits between the first hash values under comparison is less than or equal to a threshold number, the host 310 may determine that there is no image identical or similar to the target image IMG. The threshold number may be predetermined. Accordingly, the host 310 may store the target image IMG in the memory system 320.

On the other hand, when there is at least one case where the number of different bits between the first hash values under comparison is less than or equal to the threshold number (e.g., 5), the host 310 may determine that there is an image identical or similar to the target image IMG. Accordingly, the host 310 may provide the target image IMG together with a request for identity determination to the memory system 320. In some embodiments, the threshold number may be set by the manufacturer of the computing system 300, and in other embodiments, the threshold number may be set by a user.

In addition, the memory system 320 (specifically, a memory controller of the memory system 320) may receive the target image IMG from the host 310. The memory system 320 may calculate a second hash value Hash Value 2_4 of the target image IMG by using the second hash engine 321, and may compare the calculated second hash value Hash Value 2_4 with the second hash values Hash Value 2_1, Hash Value 2_2, and Hash Value 2_3 of the plurality of images stored in the second hash table 322.

While the example shown in FIG. 3 illustrates only three second hash values stored in the second hash table 322, the second hash table 322 may include second hash values of each of the plurality of images that are already stored in the memory system 320. The second hash values of each of the plurality of images may be generated from the second hash engine 321 by inputting each of the plurality of images to the second hash engine 321. The second hash table 322 may be stored in the memory controller, or may be stored in the memory system 320. In some embodiments, the second hash table 322 may be stored in a memory (not shown) such as dynamic random access memory (DRAM) outside the memory controller.

The memory system 320 may compare the second hash value Hash Value 2_4 of the target image IMG with each of the second hash values Hash Value 2_1, Hash Value 2_2, and Hash Value 2_3 of the plurality of images that are already stored in the memory system 320, and when there is a case where the second hash value Hash Value 2_4 of the target image IMG is identical to any of the second hash values Hash Value 2_1, Hash Value 2_2, and Hash Value 2_3, the memory system 320 may determine that there is an image identical to the target image IMG. The memory system 320 may provide the host 310 with information Info_IMG indicating that there is an image identical to the target image IMG. On the other hand, when there is no case where the second hash values are the same, the memory system 320 may provide the host 310 with information Info_IMG indicating that there is an image similar to the target image IMG.

When the host 310 receives information Info_IMG indicating that there is an image identical to the target image IMG, the host 310 may determine not to store the target image IMG in the memory system 320. In this case, the host 310 may end the backup operation.

On the other hand, when the host 310 receives information Info_IMG indicating that there is an image similar to the target image IMG, the host 310 may provide a write command CMD to the memory system 320 to store data corresponding to the difference between the similar image and the target image IMG. In this case, the host 310 may provide a logical address LADDR of the image similar to the target image IMG to the memory system 320 in addition to the write command CMD. The host 310 may store the first hash value of the target image IMG in the first hash table 312.

When the memory system 320 receives the write command CMD and the logical address LADDR from the host 310, the memory system 320 may identify a physical address corresponding to the received logical address, read an image stored at the identified physical address from a memory device (not shown), and calculate a difference between the target image IMG and the read image. The memory system 320 may store data corresponding to the calculated difference. The memory system 320 may store the second hash value of the target image IMG in the second hash table 322.

According to another embodiment, when the memory system 320 fails to identify a second hash value that is the same as the second hash value of the target image IMG, the memory system 320 may perform an additional operation before determining that there is an image similar to the target image IMG.

For example, the memory system 320 may determine whether a difference from the target image IMG may be calculated with respect to an image determined by the host 310 as a similar image. This is because, when the size of the image determined as the similar image is different from the size of the target image IMG, or when a difference between the two images, i.e., the image determined as the similar image and the target image IMG, is actually above a certain level of difference even if the size of the image determined as the similar image and the size of the target image IMG are equal to each other, calculating and storing the difference between the two images may be disadvantageous in terms of amount of calculation or accuracy than storing the target image IMG itself. Therefore, when the size of the image determined as the similar image and the size of the target image IMG are different from each other or a difference between the two images is actually above a certain level of difference, the memory system 320 may determine that the difference may not be calculated and determine that there is no image similar to the target image IMG.

Therefore, the memory system 320 may request the host 310 to send an address of an image corresponding to a first hash value similar to the first hash value of the target image IMG. The memory system 320 may read an image having the similar first hash value by using a received address and compare the pixel size of the read image with the pixel size of the target image IMG. In some embodiments, when the host 310 has already provided the memory system 320 with a request for identity determination and an address of an image corresponding to the similar first hash value, the memory system 320 may directly read the image corresponding to the similar first hash value without requesting an address from the host 310.

When the pixel size of the read image and the pixel size of the target image IMG are different from each other, the memory system 320 may determine that there is no image similar to the target image IMG and provide the host 310 with information Info_IMG indicating that there is no image similar to the target image IMG.

On the other hand, when the pixel size of the read image and the pixel size of the target image IMG are equal to each other, the memory system 320 may calculate a pixel-by-pixel difference by comparing, for each pixel, the target image IMG with the read image. The memory system 320 may calculate a ratio of pixels in which the difference occurs relative to all pixels and determine whether the ratio exceeds a threshold ratio. The threshold ratio may be preset. When the ratio exceeds the threshold ratio, the memory system 320 may provide the host 310 with information Info_IMG indicating that there is no similar image. When the ratio does not exceed or is equal to the threshold ratio, the memory system 320 may provide the host 310 with information Info_IMG indicating that there is a similar image. In this case, the memory system 320 may include the ratio in the information Info_IMG and provide the host 310 with the information Info_IMG including the ratio.

When the host 310 determines that there is a similar image based on the information Info_IMG received from the memory system 320, the host 310 may provide a write command CMD to the memory system 320 to store data corresponding to a difference between the similar image and the target image IMG. The memory system 320 may store data corresponding to the difference between the similar image and the target image IMG in response to the write command CMD. In detail, the memory system 320 may store data about a pixel-by-pixel difference between the target image IMG and the read image, the data having been already calculated in the process of determining whether the difference may be calculated.

Figure 4:
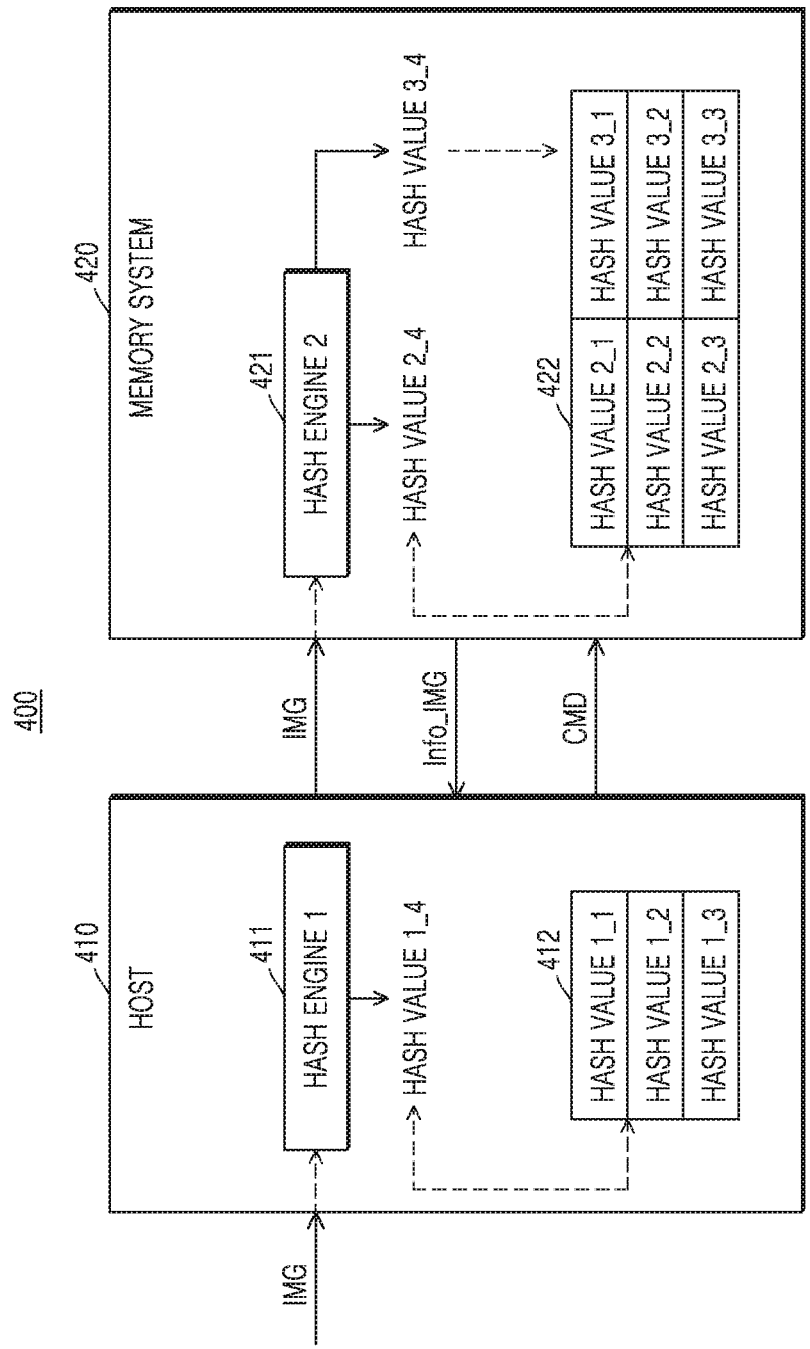
FIG. 4 is a block diagram illustrating a detailed implementation of a computing system according to an embodiment.

FIG. 4 is a block diagram illustrating a detailed implementation of a computing system 400 according to an embodiment.

FIG. 4 is a diagram of a modification of the embodiment of FIG. 3. When a host 410 performs an accurate similarity determination, a bottleneck of calculation processing of the host 410 may occur when a plurality of backup requests are received. In order to prevent this bottleneck, the computing system 400 may be implemented such that the host 410 performs a simple similarity determination and a memory system 420 additionally performs a complex similarity determination to compensate for the accuracy of the similarity determination of the host 410 and then performs the identity determination.

Referring to FIG. 4, a series of operations, in which the host 410 determines whether there is an image identical or similar to a target image IMG among a plurality of prestored images by using a first hash value and selectively provides the target image IMG to the memory system 420 according to a result of the determination, may be substantially the same as the operations of the embodiment of FIG. 3, and thus, repeated descriptions will be omitted.

The memory system 420 may calculate a third hash value Hash Value 3_4 by applying a second perceptual hash function to the target image IMG through a second hash engine (Hash Engine 2) 421. According to an embodiment, the second hash engine 421 may additionally use the second perceptual hash function as well as a cryptographic hash function. The second perceptual hash function may apply a more complicated operation than the first perceptual hash function. For example, when the first perceptual hash function outputs a hash value of 32 bits, the second perceptual hash function may output a hash value of 64 bits. Hereinafter, for convenience of description, a hash value calculated by using the second perceptual hash function is referred to as a third hash value.

Although it has been illustrated and described with reference to FIG. 4 that the memory system 420 includes a second hash engine 421 capable of using both the cryptographic hash function and the second perceptual hash function, in some embodiments the memory system 420 may include a hash engine using the cryptographic hash function and a hash engine using the second perceptual hash function. In other words, in some embodiments, the second hash engine 421 may include two hash engines.

In addition, the memory system 420 may compare the calculated third hash value Hash Value 3_4 with third hash values Hash Value 3_1, Hash Value 3_2, and Hash Value 3_3 of the plurality of images by using a second hash table 422 and determine whether there is a third hash value similar to the calculated third hash value Hash Value 3_4. In this case, the second hash table 422 may additionally include the third hash values Hash Value 3_1, Hash Value 3_2, and Hash Value 3_3 as well as the second hash values Hash Value 2_1, Hash Value 2_2, and Hash Value 2_3 described above and generated by applying a cryptographic hash function to each of the plurality of images.

As an example, the memory system 420 may compare the third hash value Hash Value 3_4 of the target image IMG with each of the third hash values Hash Value 3_1, Hash Value 3_2, and Hash Value 3_3 of the plurality of images and determine whether there is a case where the number of different bits therebetween is equal to or less than a threshold number (for example, 5). The threshold number may be predetermined.

When there is no case where the number of different bits is equal to or less than the threshold number, the memory system 420 may provide the host 410 with information Info_IMG indicating that there is no image similar to the target image IMG.

On the other hand, when there is at least one case where the number of different bits is equal to or less than the threshold number, the memory system 420 may determine that there is an image identical or similar to the target image IMG. The memory system 420 may calculate a second hash value Hash Value 2_4 by applying a cryptographic hash function to the target image IMG through the second hash engine 421 in order to determine whether there is an image identical to the target image IMG. The memory system 420 may compare the calculated second hash value Hash Value 2_4 with second hash values Hash Value 2_1, Hash Value 2_2, and Hash Value 2_3 of the plurality of images stored in the second hash table 422 and determine whether there is a second hash value that is the same as the calculated second hash value Hash Value 2_4.

When there is no same second hash value, the memory system 420 may provide the host 410 with information Info_IMG indicating that there is an image similar to the target image IMG. On the other hand, when there is a same second hash value, the memory system 420 may provide the host 410 with information Info_IMG indicating that there is an image identical to target image IMG.

The host 410 may store at least a portion of the target image IMG based on the information Info_IMG received from the memory system 420. When receiving the information Info_IMG indicating that there is an image identical to the target image IMG, the host 410 may determine not to store the target image IMG in the memory system 420.

When receiving information Info_IMG indicating that there is an image similar to the target image IMG, the host 410 may provide a write command CMD to the memory system 420 to store data corresponding to a difference between the similar image and the target image IMG in the memory system 420. The host 410 may store the first hash value of the target image IMG in the first hash table 412.

In addition, when receiving information Info_IMG indicating that there is no image identical or similar to the target image IMG, the host 410 may provide a write command CMD to the memory system 420 to store the target image IMG. The host 410 may store the first hash value of the target image IMG in the first hash table 412.

When the memory system 420 receives, from the host 410, a write command CMD requesting the memory system 420 to store data corresponding to a difference between the similar image and the target image IMG, the memory system 420 may read, from a memory device (not shown), an image corresponding to a third hash value similar to the third hash value of the target image IMG and may calculate a difference between the target image IMG and the read image. The memory system 420 may store data corresponding to the calculated difference. The memory system 420 may store the second hash value and the third hash value of the target image IMG in the second hash table 422.

In addition, when the memory system 420 receives, from the host 410, a write command CMD requesting the memory system 420 to store the target image IMG, the memory system 420 may store the target image IMG. The memory system 420 may store the second hash value and the third hash value of the target image IMG in the second hash table 422.

According to another embodiment, when the memory system 420 fails to identify a second hash value that is the same as the second hash value of the target image IMG, the memory system 420 may determine whether a difference from the target image IMG may be calculated with respect to an image corresponding to a third hash value similar to the third hash value of the target image IMB, before determining that there is an image similar to the target image IMG. The memory system 420 may provide the host 410 with information indicating whether there is an image identical or similar to the target image IMG, according to a result of the determination. This procedure is to determine whether it is more advantageous to store the target image IMG itself even when there is a similar image, as described above with reference to FIG. 3. In addition, a method of determining whether the difference may be calculated may be substantially the same as that described above with reference to FIG. 3, and thus, repeated descriptions will be omitted.

When the host 410 determines that there is a similar image based on the information Info_IMG received from the memory system 420, the host 410 may provide a write command CMD to the memory system 420 to store data corresponding to a difference between the similar image and the target image IMG. The memory system 420 may store data corresponding to the difference between the similar image and the target image IMG in response to the write command CMD.

According to the embodiments described with reference to FIG. 4, an amount of calculation performed by the host 410 may be reduced because the host 410 performs a simple level of similarity determination and the memory system 420 performs more complicated similarity determination. Accordingly, a bottleneck of calculation processing which may occur in the host 410 may be further prevented, and a similarity determination between a target image and a plurality of pre-stored images may be accurately performed since more complicated similarity determination is additionally performed.

Figure 5:
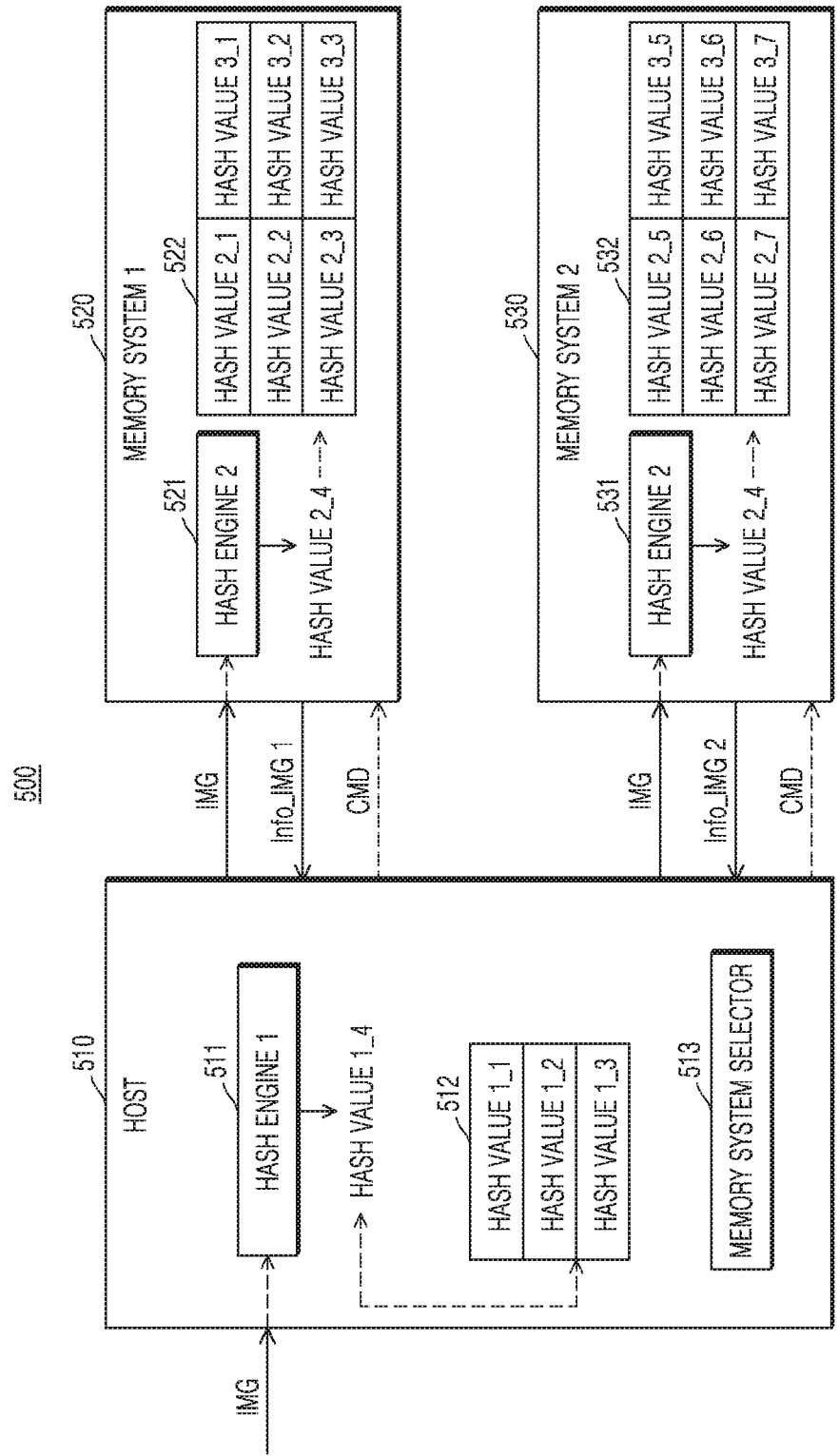
FIG. 5 is a block diagram illustrating a detailed implementation of a computing system according to an embodiment.

FIG. 5 is a block diagram illustrating a detailed implementation of a computing system 500 according to an embodiment.

FIG. 5 illustrates a modification of the embodiment of FIG. 4 and is a diagram of an embodiment in which a computing system includes a plurality of memory systems capable of performing identity or similarity determination. Referring to FIG. 5, the computing system 500 may include a host 510 and a plurality of memory systems, e.g., a first memory system 520 and a second memory system 530. In addition, the host 510 may include a first hash engine 511, a first hash table 512, and a memory system selector 513. In addition, the first memory system 520 may include a second hash engine 521 and a second hash table 522, and the second memory system 530 may include a second hash engine 531 and a second hash table 532. The first memory system 520 may store a first plurality of images, and the second hash table 522 may store hash values of the first plurality of images. The second memory system 530 may store a second plurality of images, and the second hash table 523 may store hash values of the second plurality of images.

The host 510 may calculate a first hash value of a target image IMG by using the first hash engine 511 and may identify a first hash value similar to the calculated first hash value by using the first hash table 512. The host 510 may identify a memory system that stores an image corresponding to the similar first hash value. The host 510 may provide the target image IMG to the identified memory system.

For example, when a hash value similar to a calculated first hash value Hash Value 1_4 is a hash value Hash Value 1_1, the host 510 may determine that a memory system storing the hash value Hash Value 1_1 is the first memory system 520, with reference to logical addresses of the plurality of images. In addition, the host 510 may provide the target image IMG to the first memory system 520 and request identity determination.

When there are a plurality of hash values similar to the first hash value calculated by the host 510 and images corresponding to the plurality of hash values are also stored in the plurality of memory systems, e.g., the first and second memory systems 520 and 530, respectively, the host 510 may provide the target image IMG to both the first memory system 520 and the second memory system 530 and request identity determination.

Each of the first and second memory systems 520 and 530 may calculate a third hash value of the target image IMG by using a second perceptual hash function of the second hash engine 521 or 531, respectively, and may identify a third hash value similar to the calculated third hash value. When the similar third hash value may not be identified, the first and second memory systems 520 and 530 may provide the host 510 with information Info_IMG 1 and Info_IMG 2, respectively, indicating that there is no similar image.

On the other hand, when the similar third hash value may be identified, the first and second memory systems 520 and 530 may calculate a second hash value of the target image IMG by using a cryptographic hash function of the second hash engine 521 or 531, respectively, and may identify a second hash value, which is the same as the calculated second hash value of the target image IMG, by using the second hash table 522 or 532, respectively. When the same second hash value is identified, the first and second memory systems 520 and 530 may provide the host 510 with information Info_IMG 1 and Info_IMG 2, respectively, indicating that there is an identical image.

On the other hand, when there is no same second hash value, the first and second memory systems 520 and 530 may perform an additional operation before determining that there is an image similar to the target image IMG. In detail, the first and second memory systems 520 and 530 may determine whether a difference from the target image IMG may be calculated with respect to an image determined as the similar image before performing identity determination.

For example, the plurality of memory systems 520 and 530 may compare the pixel size of the target image IMG with the pixel size of an image corresponding to a third hash value similar to the third hash value of the target image IMG, or calculate a pixel-by-pixel difference by comparing, for each pixel, both images, i.e., the target image IMG and the image corresponding to the third hash value and calculate a ratio of pixels in which the difference occurs relative to all pixels, and thereby may determine whether a difference between the both images may be calculated. The first and second memory systems 520 and 530 may provide the host 510 with information Info_IMG 1 and Info_IMG 2, respectively, indicating whether there is an image identical or similar to the target image IMG according to a result of the determination. In this case, the information Info_IMG 1 and Info_IMG 2 may include the ratio described above or the number of different bits between the third hash value of the target image IMG and a third hash value similar to the third hash value of the target image IMG.

When the host 510 provides the target image IMG to only one of the first and second memory systems 520 and 530, the host 510 may store only a portion of the target image IMG based on only information about the target image IMG received from a memory system provided with the target image IMG.

When the host 510 provides the target image IMG to both of the first and second memory systems 520 and 530, the host 510 may receive the information Info_IMG 1 and Info_IMG 2 about the target image IMG from the first and second memory systems 520 and 530, respectively, and may store at least a portion of the target image IMG based on the received information.

For example, when it is determined that there is an image identical to the target image IMG based on the received information, the host 510 may determine not to store the target image IMG. In addition, when it is determined that there is no image identical or similar to the target image IMG based on the received information, the host 510 may determine to store the target image IMG.

When it is determined, based on the received information, that there is no image identical to the target image IMG but there are a plurality of similar images in each of the first and second memory system 520 and 530, the host 510 may select, by using the memory system selector 513, a memory system to request data corresponding to a difference between a similar image stored in each memory system and the target image IMG.

As an example, the memory system selector 513 may select a memory system to request data corresponding to the difference, based on at least one of the number of different bits between third hash values included in the information Info_IMG 1 and Info_IMG 2 respectively received from the first and second memory systems 520 and 530, the ratio of pixels in which the difference occurs relative to all pixels, and a usage amount of each of the first and second memory systems 520 and 530. This procedure is to prevent a bottleneck from occurring because calculation processing is performed only in one of the first and second memory systems 520 and 530. In some embodiments, the memory system selector 513 may select a memory system by using additional information in addition to the above-described information.

The host 510 may request data corresponding to a difference between a similar image and the target image IMG from the memory system selected by the memory system selector 513. The memory system receiving the request may provide the host 510 with data corresponding to the difference between the similar image and the target image IMG. For example, the memory system may provide the host 510 with data about a pixel-by-pixel difference between an image corresponding to a similar third hash value and the target image IMG, the data having been already calculated in the process of determining whether the difference may be calculated.

The host 510 may transmit a write command CMD, which requests the storing of data corresponding to a difference between a similar image and the target image IMG, to a memory system storing the similar image. The memory system receiving the write command CMD may receive and store the data corresponding to the difference from the host 510.

Although it has been illustrated and described with reference to FIG. 5 that the second hash engines of the plurality of memory systems perform identity and similarity determination by using a second perceptual hash function and a cryptographic hash function, in some embodiments each of the plurality memory systems may perform only identity determination by using only a cryptographic hash function, like the memory system 320 of FIG. 3.

According to the embodiments described with reference to FIG. 5, since the computing system 500 includes a plurality of memory systems, e.g., the first and second memory systems 520 and 530, that may perform identity or similarity determination on images respectively stored in the plurality of memory systems, a bottleneck of calculation processing may be further prevented compared to a case where one memory system performs both identity determination and similarity determination on all previously stored images.

Figure 6:
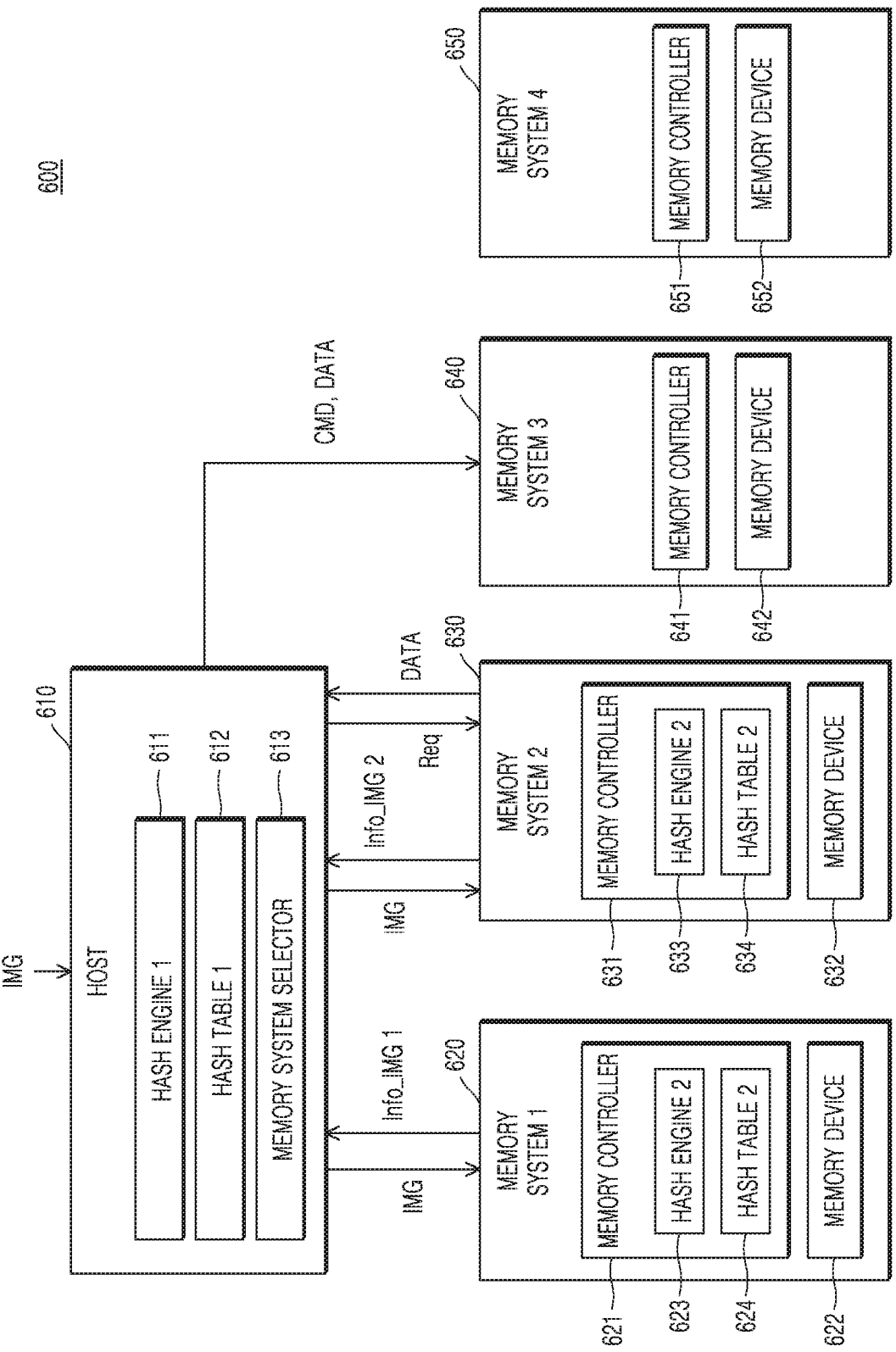
FIG. 6 is a block diagram illustrating a detailed implementation of a computing system according to an embodiment.

FIG. 6 is a block diagram illustrating a detailed implementation of a computing system 600 according to an embodiment.

FIG. 6 illustrates a modification of the embodiment of FIG. 5 and is a diagram of an embodiment in which a computing system includes a plurality of memory systems, some of which may not be capable of determining identity or similarity for images. Referring to FIG. 6, the computing system 600 may include a host 610 and a plurality of memory systems, e.g., a first memory system 620, a second memory system 630, a third memory system 640, and a fourth memory system 650. In addition, the host 610 may include a first hash engine 611, a first hash table 612, and a memory system selector 613. In addition, the first to fourth memory systems 620, 630, 640, and 650 may include first to fourth memory controllers 621, 631, 641, and 651, respectively, and first to fourth memory devices 622, 632, 642, and 652, respectively, and each of the first to fourth memory systems 620, 630, 640, and 650 may store a plurality of images. The first memory system 620 may include a second hash engine 623 and a second hash table 624, and the second memory system 630 may include a second hash engine 633 and a second hash table 634. In contrast, the third memory system 640 and the fourth memory system 650 may not include a hash engine and a hash table.

According to an embodiment, the second hash tables 624 and 634 may include hash values of images stored in the third memory system 640 and the fourth memory system 650 as well as images stored in the first memory system 620 and the second memory system 630. For example, the second hash table 624 of the first memory system 620 may include hash values of images stored in the first memory system 620 and images stored in the third memory system 640. The second hash table 634 of the second memory system 630 may include hash values of images stored in the second memory system 630 and images stored in the fourth memory system 650. However, this is only an example, and in other embodiments, the combinations of images may vary.

The host 610 may calculate a first hash value of a target image IMG by using the first hash engine 611 and identify a first hash value similar to the calculated first hash value by using the first hash table 612. When the similar first hash value is identified, the host 610 may provide the target image IMG to a memory system managing a hash value of an image corresponding to the similar first hash value.

As an example, the first hash table 612 may include first hash values of each of the images stored in the first to fourth memory systems 620, 630, 640, and 650 and may also include information about a memory system managing logical addresses of the stored images and hash values of the stored images. Therefore, the host 610 may identify a memory system managing the similar first hash value with reference to the first hash table 612. In addition, when a plurality of similar first hash values are identified, the host 610 may identify each of the memory systems that manage the plurality of similar first hash values. For example, the host 610 may identify the first memory system 620 and the second memory system 630 as the memory systems that manage the plurality of similar first hash values.

The first memory system 620 may determine identity or similarity between the target image IMG and a plurality of images stored in the first memory system 620 and the third memory system 640 by using the second hash engine 623 and the second hash table 624. The first memory system 620 may provide the host 610 with information Info_IMG 1 corresponding to a result of the determination.

The second memory system 630 may determine identity or similarity between the target image IMG and a plurality of images stored in the second memory system 630 and the fourth memory system 650 by using the second hash engine 633 and the second hash table 634. The second memory system 630 may provide the host 610 with information Info_IMG 2 corresponding to a result of the determination.

According to an embodiment, in the process of determining identity or similarity between the target image IMG and pre-stored images, the first memory system 620 and the second memory system 630 may read an image stored in the third memory system 640 or the fourth memory system 650 and determine the similarity by using the read image.

For example, the first memory system 620 may perform identity determination by comparing a second hash value of the target image IMG with second hash values of the images stored in the first memory system 620 and the third memory system 640. However, in this case, it may be determined that there is no identical image. According to an embodiment, the first memory system 620 may determine whether a difference from the target image IMG may be calculated with respect to an image determined as the similar image before determining identity. In this case, the image determined as the similar image may be an image stored in the third memory system 640. Therefore, the first memory system 620 may directly read the image from the third memory system 640 or request a read from the host 610 to receive the image through the host 610. In addition, the first memory system 620 may determine that the difference may be calculated by using an image read from the third memory system 640 and the target image IMG, and may provide the host 610 with information indicating whether there is an image identical or similar to the target image IMG according to a result of the determination.

The host 610 may receive information Info_IMG 1 and Info_IMG 2, which indicates whether there is an image identical or similar to the target image IMG, from the first memory system 620 and/or the second memory system 630. When receiving a plurality of pieces of information Info_IMG 1 and Info_IMG 2 from the first and second memory systems 620 and 630, the host 610 may use the memory system selector 613 to select a memory system to request data corresponding to a difference between a similar image and the target image IMB.

For example, the memory system selector 613 may select a memory system to request data corresponding to the difference between the similar image and the target image IMG, based on information Info_IMG 1 and Info_IMG 2 respectively received from the first and second memory systems 620 and 630 and a usage amount of each of the first and second memory systems 620 and 630. The host 610 may request data corresponding to the difference between the similar image and the target image IMG from the selected memory system. The selected memory system may provide the data to the host 610 according to a request of the host 610.

For example, when the memory system selector 613 selects the second memory system 630, the host 610 may transmit a request signal Req for requesting data corresponding to the difference to the second memory system 630. The second memory system 630 may provide the host 610 with data DATA corresponding to the difference between the similar image and the target image IMG in response to the received request signal Req.

When the host 610 receives the data DATA, the host 610 may select a memory system to store the data DATA. For example, the host 610 may identify a memory system in which the similar image is stored as the third memory system 640, and may provide a write command CMD and the data DATA to the third memory system 640 to write the data DATA to the identified memory system. Alternatively, in some embodiments, the host 610 may select a memory to store the data DATA by considering a usage amount of the first to fourth memory systems 620, 630, 640, and 650, and may provide a write command CMD and the data DATA to write the data DATA to the selected memory system. A method of selecting a memory system in which the host 610 stores the data DATA is not limited to the above-described example.

According to the embodiments described above with reference to FIG. 6, even when the computing system includes a memory system that does not support a calculation processing function using a hash, the computing system may perform an image backup function using the determination of identity and similarity between images.

Figure 7:
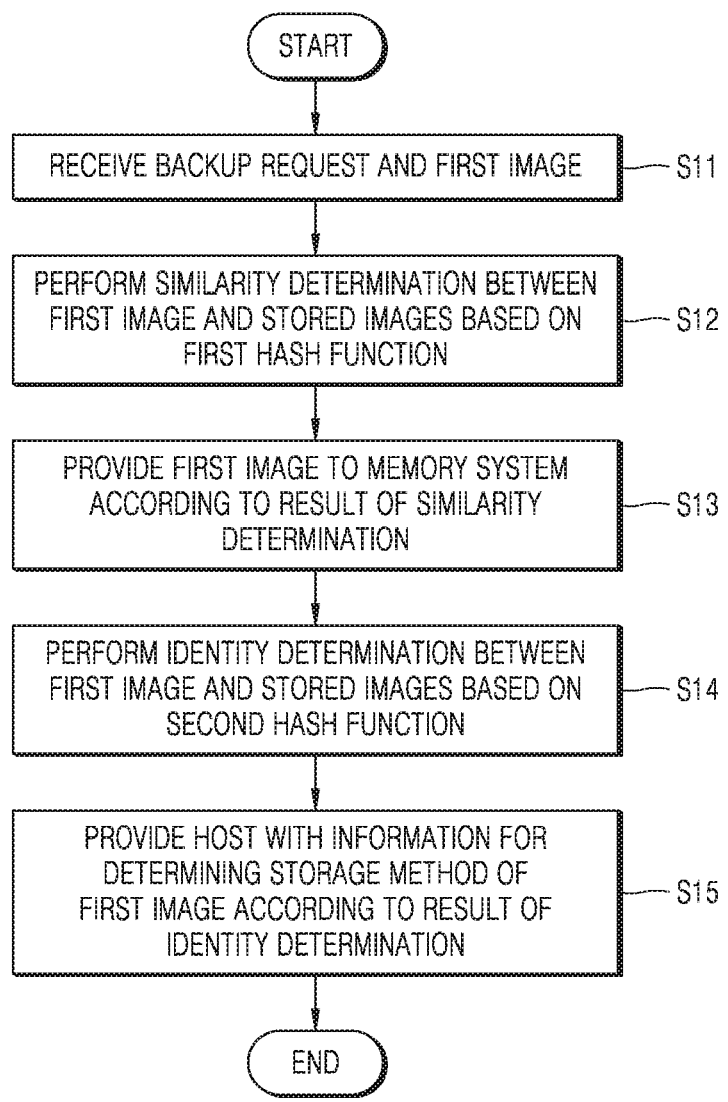
FIG. 7 is a flowchart of an image backup method according to an embodiment.

FIG. 7 is a flowchart of an image backup method according to an embodiment. The image backup method illustrated in FIG. 7 may be performed in the computing systems of FIGS. 1 and 3 to 6.

A host may receive a backup request and a first image from the outside of the host (Operation S11). The host may perform a similarity determination between the first image and a plurality of images stored in a memory system based on a first hash function (Operation S12). In this case, the first hash function may be a perceptual hash function. The perceptual hash function may correspond to one selected from BMB hash, DCT hash, DWT hash, PCA hash, MH hash, and RADIAL hash. However, these perceptual hash functions are only examples, and embodiments are not limited thereto.

In detail, the host may calculate a first hash value by applying the first hash function to the first image. The host may compare the calculated first hash value with each of the first hash values of the plurality of images to determine whether they are similar to each other. When there is a first hash value similar to the calculated first hash value, the host may determine that there is an image, which is identical or similar to the first image, in the memory system. On the other hand, when there is no first hash value similar to the calculated first hash value, the host may determine that there is no image, which is identical or similar to the first image, in the memory system.

The host may provide the first image to the memory system according to a result of the similarity determination (Operation S13). For example, the host may selectively provide the first image to the memory system according to the result of the similarity determination. In detail, when the host determines that there is an image, which is identical or similar to the first image, in the memory system, the host may provide the first image to the memory system. When the host determines that there is no image, which is identical or similar to the first image, in the memory system, the host may store the first image in the memory system.

The memory system may perform an identity determination between the first image and the images stored in the memory system based on a second hash function (Operation S14). In this case, the second hash function may be a cryptographic hash function. The cryptographic hash function may correspond to one selected from OST, HAVAL, MD2, MD4, MD5, PANAMA, RadioGatun, RIPEMD, RIPEMD-128/256, RIPEMD-160, RIPEMD-320, SHA-0, SHA-1, SHA-256/224, SHA-512/384, SHA-3, and WHIRLPOOL. However, these cryptographic hash functions are only examples, and embodiments are not limited thereto.

In detail, the memory system may calculate a second hash value by applying the second hash function to the first image. The memory system may compare the calculated second hash value with each of the second hash values of the plurality of images to determine whether they are the same as each other. When there is a second hash value that is the same as the calculated second hash value, the host may determine that there is an image, which is identical to the first image, in the memory system. On the other hand, when there is no second hash value that is the same as the calculated second hash value, the host may determine that there is an image similar to the first image in the memory system.

The memory system may provide the host with information for determining a storage method of the first image according to a result of the identity determination (Operation S15). In detail, the memory system may provide the host with information about the presence or absence of an image identical or similar to the first image.

The host may store at least a portion of the first image based on the received information. In detail, when receiving information indicating that there is no image similar to the first image, the host may store the entire first image. When receiving information indicating that there is an image similar to the first image, the host may store data corresponding to a difference between the first image and the similar image. When receiving information indicating that there is an image identical to the first image, the host may determine not to store the first image and may terminate the image backup operation without storing the first image.

When the host stores at least a portion of the first image in response to receiving information indicating that there is an image similar to the first image or there is no image identical or similar to the first image, the host may store the first hash value and the second hash value of the first image.

Figure 8:
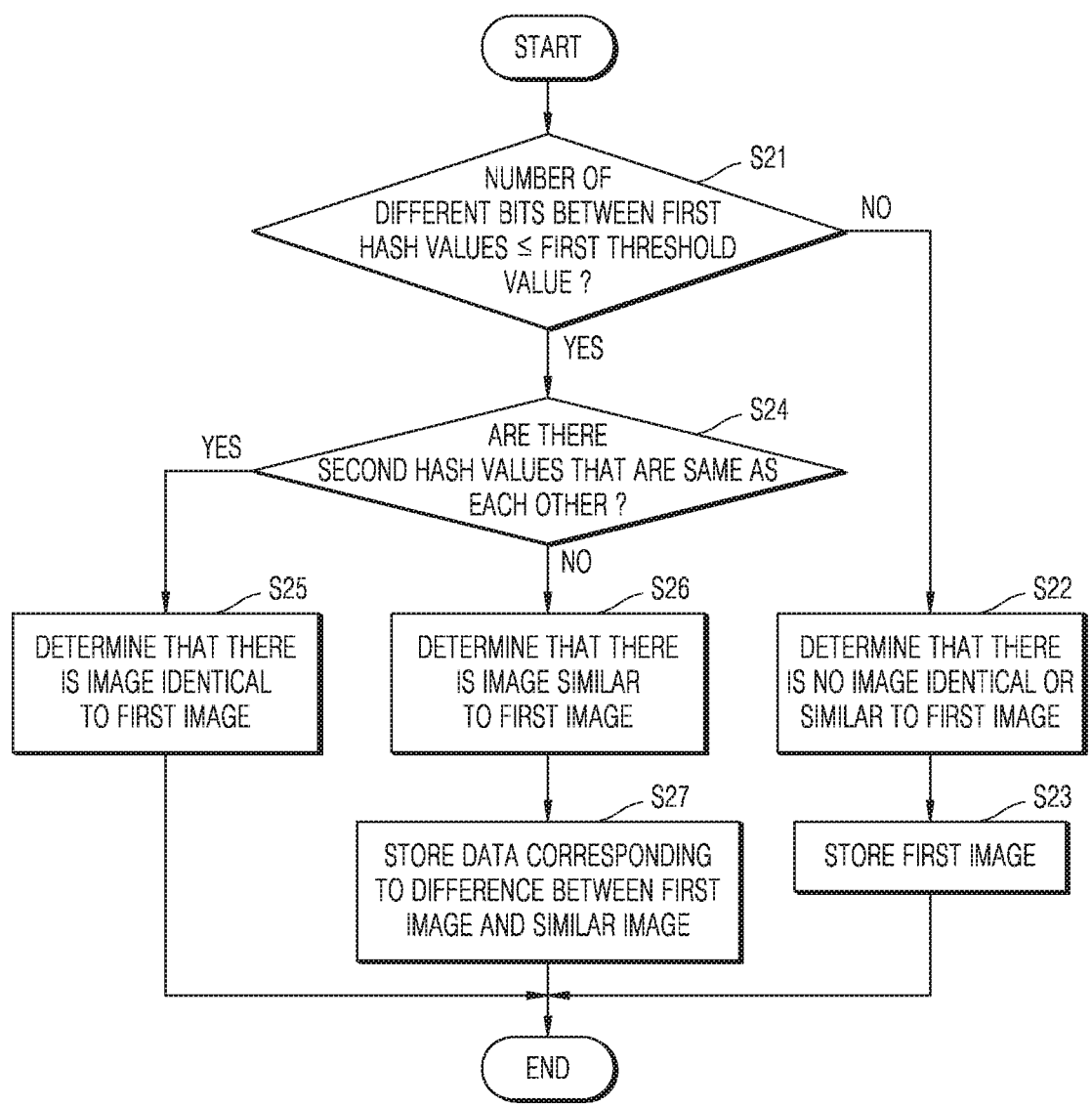
FIG. 8 is a flowchart illustrating a detailed implementation of an image backup method according to an embodiment.

FIG. 8 is a flowchart illustrating a detailed implementation of an image backup method according to an embodiment. In detail, FIG. 8 is a flowchart specifically illustrating an operation of determining identity and similarity between a target image and pre-stored images and an operation of storing the target image. The image backup method illustrated in FIG. 8 may be performed in the computing systems of FIGS. 1 and 3 to 6.

A host may determine whether a number of different bits between first hash values is less than or equal to a first threshold value (Operation S21). In detail, the host may compare a first hash value of a first image with each of the first hash values of a plurality of images stored in a memory system to determine whether the number of different bits therebetween is less than or equal to a first threshold value.

When the number of different bits exceeds the first threshold value (Operation S21—NO), the host may determine that there is no image identical or similar to the first image (Operation S22). The host may store the first image (Operation S23). In detail, the host may store the first image in the memory system.

On the other hand, when there is at least one case where the number of different bits is equal to or less than the first threshold value (Operation S21—YES), the memory system may determine whether there are second hash values that are the same as each other (Operation S24). In detail, the memory system may compare a second hash value of the first image with each of the second hash values of the plurality of images to determine whether the second hash values are the same as each other. For example, when the number of different bits is equal to or less than the first threshold value, the host may determine that there is an identical or similar image and provide the first image to the memory system. Then, the memory system may compare a second hash value of the first image with each of the second hash values of the plurality of images.

When there is a second hash value that is the same as the second hash value of the first image (Operation S24—YES), the memory system may determine that there is an image identical to the first image (Operation S25). The memory system may provide the host with information indicating that there is an image identical to the first image. The host may determine not to store the first image in the memory system.

On the other hand, when there is no second hash value that is the same as the second hash value of the first image (Operation S24—NO), the memory system may determine that there is an image similar to the first image (Operation S26). The memory system may provide the host with information indicating that there is an image similar to the first image.

The host may store data corresponding to a difference between the first image and the similar image (Operation S27). In detail, the memory system may compare, for each pixel, the first image with the similar image to calculate data corresponding to the difference, and may provide the calculated data to the host. The host may provide the calculated data and a write command to the memory system, and the memory system may store the calculated data.

Although it has been described with reference to FIG. 8 that the host or the memory system performs some of the series of operations, in some embodiments, the host may perform all of the series of operations, and in other embodiments, the memory system may perform all of the series of operations. In these cases, an operation of transmitting a target image of a backup request or information used to determine a storage method of the target image between the host and the memory system may be omitted.

Figure 9:
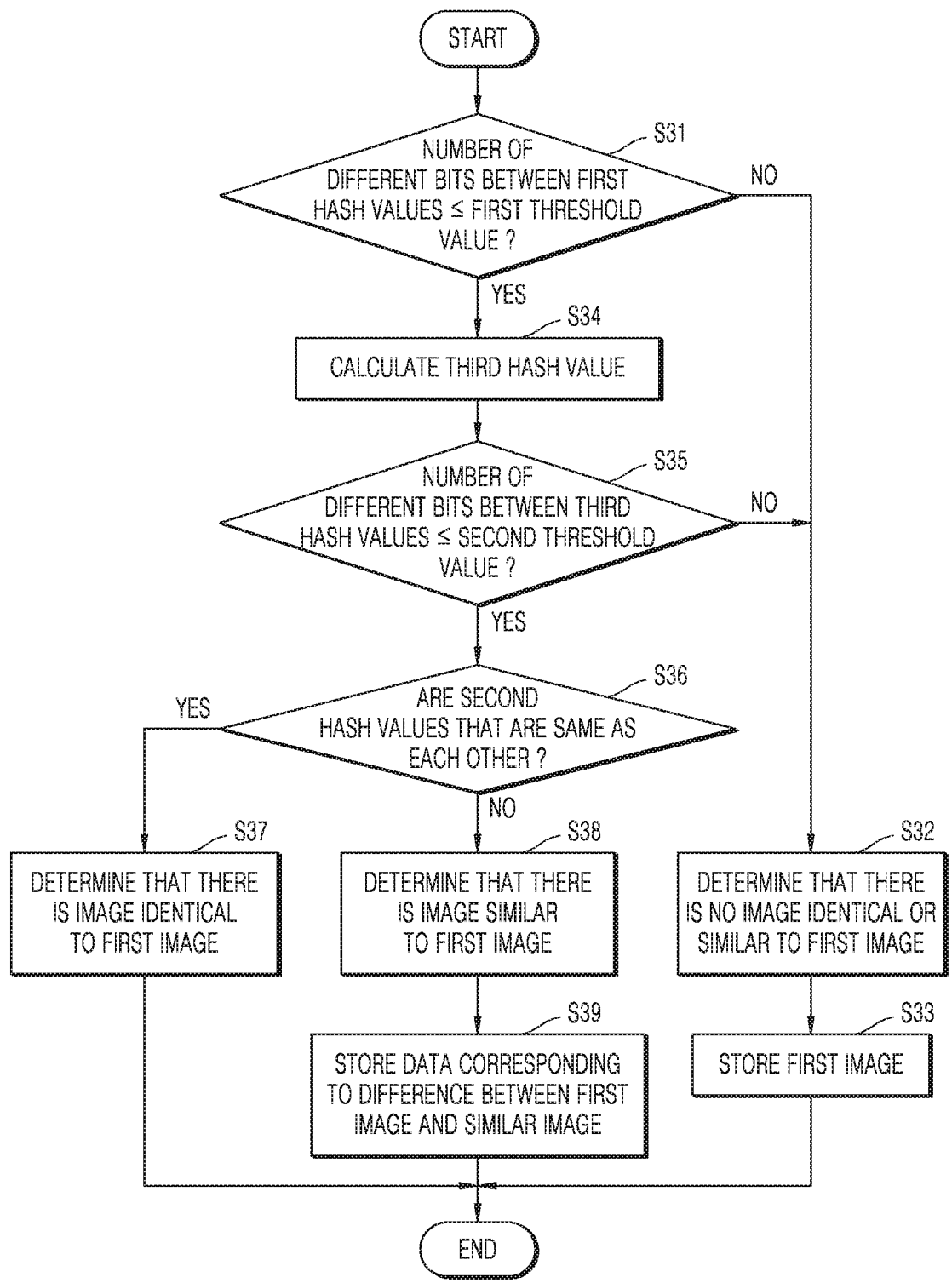
FIG. 9 is a flowchart illustrating a detailed implementation of an image backup method according to an embodiment.

FIG. 9 is a flowchart illustrating a detailed implementation of an image backup method according to an embodiment. In detail, FIG. 9 illustrates a modification of the embodiment of FIG. 8 and is a flowchart illustrating an embodiment of performing an additional similarity determination. The image backup method illustrated in FIG. 9 may be performed in the computing systems of FIGS. 1 and 3 to 6.

The host may determine whether a number of different bits between first hash values is less than or equal to a first threshold value (Operation S31). In detail, the host may compare a first hash value of a first image with each of the first hash values of a plurality of images stored in a memory system to determine whether the number of different bits therebetween is equal to or less than a first threshold value.

When the number of different bits exceeds the first threshold value (Operation S31-NO), the host may determine that there is no image identical or similar to the first image (Operation S32). The host may store the first image (Operation S33). In detail, the host may store the first image in the memory system.

On the other hand, when there is at least one case where the number of different bits is equal to or less than the first threshold value (Operation S31—YES), the memory system may calculate a third hash value of the first image (Operation S34). For example, when the number of different bits is equal to or less than the first threshold value, the host may determine that there is an identical or similar image and provide the first image to the memory system. In addition, the memory system may compare a second hash value of the first image with each of the second hash values of the plurality of images to perform a more accurate similarity determination. In detail, the memory system may calculate a third hash value by applying a second perceptual hash function to the first image. In this case, the second perceptual hash function may apply a more complicated operation than the first perceptual hash function.

The memory system may determine whether a number of different bits between the third hash values is less than or equal to a second threshold value (Operation S35). In detail, the memory system may compare the third hash value of the first image with each of the third hash values of the plurality of images to determine whether the number of different bits therebetween is less than or equal to a second threshold value. In this case, the second threshold may be the same as or different from the first threshold. When the number of different bits exceeds the second threshold value (Operation S35—NO), the memory system may determine that there is no image identical or similar to the first image (Operation S32). The host may store the first image (Operation S33). In detail, the host may store the first image in the memory system.

On the other hand, when there is at least one case where the number of different bits is less than or equal to the second threshold value (Operation S35—YES), the memory system may determine whether second hash values are the same as each other (Operation S36). In detail, the memory system may compare a second hash value of the first image with each of the second hash values of the plurality of images to determine whether they are the same as each other. When there is a second hash value that is the same as the second hash value of the first image (Operation S36—YES), the memory system may determine that there is an image identical to the first image (Operation S37). The memory system may provide the host with information indicating that there is an image identical to the first image. The host may determine not to store the first image in the memory system.

On the other hand, when there is no second hash value that is the same as the second hash value of the first image (Operation S36—NO), the memory system may determine that there is an image similar to the first image (Operation S38). The memory system may provide the host with information indicating that there is an image similar to the first image.

The host may store data corresponding to a difference between the first image and the similar image (Operation S39). In detail, the memory system may compare, for each pixel, the first image with the similar image to calculate data corresponding to the difference, and may provide the calculated data to the host. The host may provide the calculated data and a write command to the memory system, and the memory system may store the calculated data.

Although it has been described with reference to FIG. 9 that the host or the memory system performs some of the series of operations, in some embodiments, the host may perform all of the series of operations, and in other embodiments, the memory system may perform all of the series of operations. In these cases, an operation of transmitting a target image of a backup request or information used to determine a storage method of the target image between the host and the memory system may be omitted.

Figure 10:
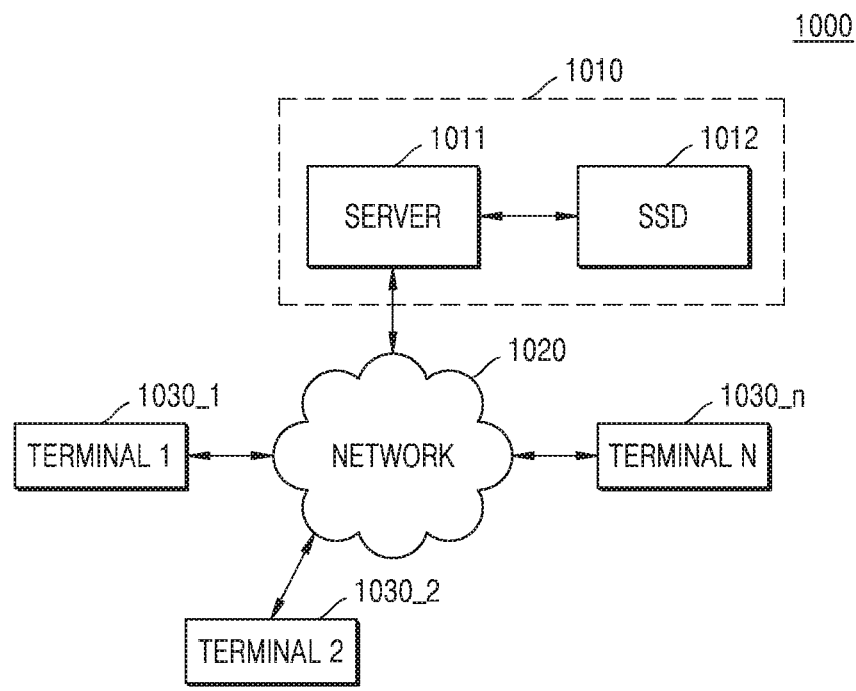
FIG. 10 is a block diagram of a network system including a server system according to an embodiment.

FIG. 10 is a block diagram of a network system 1000 including a server system 1010 according to an embodiment. In FIG. 10, a plurality of terminals (e.g., computing nodes) are shown together with a server system, and the server system may be implemented using a computing system according to the embodiments illustrated in FIGS. 1 and 3-6.

Referring to FIG. 10, the network system 1000 may include a plurality of terminals 1030_1 to 1030_n communicating with the server system 1010 through a network 1020. The server system 1010 may include a server 1011 and an SSD 1012. The server 1011 may perform the function of a host and the SSD 1012 may perform the function of a memory system in the embodiments of FIGS. 1 and 3-9.

The server 1011 may process requests transmitted from the plurality of terminals 1030_1 to 1030_n connected to the network 1020. As an example, the server 1011 may store a target image requested for backup in the SSD 1012 according to a backup request received from the plurality of terminals 1030_1 to 1030_n.

Specifically, as in the embodiments described above with reference to FIGS. 1 and 3-9, the server 1011 may calculate a first hash value of the target image by using a first perceptual hash function and determine whether there is an image similar to the target image among a plurality of images previously stored in the SSD 1012. When there is an image similar to the target image, the server 1011 may provide the target image to the SSD 1012. The SSD 1012 may calculate a second hash value by applying a second perceptual hash function to the target image and calculate a third hash value by applying a cryptographic hash function to the target image. In addition, the SSD 1012 may additionally determine whether there is an image identical or similar to the target image among the plurality of images previously stored in the SSD 1012, based on the calculated second hash value and third hash value, and may provide a result of the determination to the server 1011. In addition, the server 1011 may store at least a portion of the target image in the SSD 1012 according to the result of the determination, and thus, the SSD 1012 may obtain higher efficiency of storage space.

While the inventive concept has been particularly shown and described with reference to various embodiments thereof, it will be understood that various changes in form and details may be made therein without departing from the spirit and scope of the following claims.

What is claimed is:

1. An image backup method of a computing system including a host and a memory system provided separately from and communicatively coupled to the host, the image backup method comprising: receiving, by the host, a first image, together with a backup request; applying, by a perceptual hash engine of the host, a perceptual hash function to the first image to generate a perceptual hash value of the first image; performing, by the host, a similarity determination between the first image and a plurality of images stored in the memory system, based on the perceptual hash value of the first image; providing, by the host to the memory system that is separate from the host, the first image when the result of the similarity determination is identical or similar; receiving, by the memory system, the first image from the host when the result of the similarity determination is identical or similar; applying, by a cryptographic hash engine of the memory system, a cryptographic hash function to the first image to generate a cryptographic hash value of the first image; performing, by the memory system, an identity determination between the first image and the plurality of images, based on the cryptographic hash value of the first image; and providing, by the memory system to the host, information for determining a storage method of the first image according to a result of the identity determination, wherein the performing the similarity determination comprises:
when a number of different bits between the perceptual hash value of the first image and perceptual hash values of the plurality of images is less than or equal to a threshold number, determining that there is an image among the plurality of images that is identical or similar to the first image; and when the number of different bits is not less than or equal to the threshold number, determining that there is no image among the plurality of images that is identical or similar to the first image.

2. The image backup method of claim 1, wherein the performing the similarity determination comprises: comparing the perceptual hash value of the first image with each of perceptual hash values of the plurality of images to identify, for each of the plurality of images, the number of different bits therebetween.

3. The image backup method of claim 1, wherein the selectively providing the first image to the memory system comprises, when the host determines that there is an image among the plurality of images that is identical or similar to the first image, providing the first image to the memory system.

4. The image backup method of claim 1, wherein the selectively providing the first image to the memory system comprises, when the host determines that there is no image among the plurality of images that is identical or similar to the first image, storing the first image.

5. The image backup method of claim 1, wherein the performing the identity determination comprises:
comparing the cryptographic hash value with each of cryptographic hash values of the plurality of images to determine, for each of the plurality of images, whether the compared crypotgraphic hash values are the same as each other.

6. The image backup method of claim 5, wherein the performing the identity determination comprises:
when the compared cryptographic hash values are the same as each other, determining that there is an image among the plurality of images that is identical to the first image; and
when the compared cryptographic hash values are not the same as each other, determining that there is an image among the plurality of images that is similar to the first image.

7. The image backup method of claim 1, further comprising performing, by the memory system, a second similarity determination between the first image and the plurality of images, based on a third hash value of the first image to which a third hash function is applied,
wherein the performing the identity determination comprises performing the identity determination between the first image and the plurality of images according to a result of the second similarity determination.

8. The image backup method of claim 7, wherein the performing the second similarity determination comprises:
calculating the third hash value of the first image by applying the third hash function to the first image; and
comparing the calculated third hash value with each of third hash values of the plurality of images to identify, for each of the plurality of images, a number of different bits therebetween.

9. The image backup method of claim 8, wherein the performing the second similarity determination comprises:
when there are third hash values that are the same as each other, determining that there is an image among the plurality of images that has a possibility that the image is identical to the first image;
when there is a case where the number of different bits between the third hash values is less than or equal to a threshold number, determining that there is an image among the plurality of images that is similar to the first image; and
when there is no case where the number of different bits is less than or equal to the threshold number, determining that there is no image among the plurality of images that is identical or similar to the first image.

10. The image backup method of claim 9, wherein the performing the identity determination comprises, when the memory system determines that there is an image that has the possibility that the image is identical to the first image, performing the identity determination between the first image and the plurality of images.

11. The image backup method of claim 7, wherein providing the host with the information for determining the storage method of the first image comprises generating the information for determining the storage method of the first image according to the result of the second similarity determination.

12. The image backup method of claim 7, wherein the third hash function applies a more complicated operation than the perceptual hash function.

13. The image backup method of claim 1, further comprising:
determining, by the host, the storage method of the first image according to the result of the identity determination; and
when the host determines that there is a similar image that is similar to the first image based on the information for determining the storage method of the first image, storing, in the memory system, data corresponding to a difference between the first image and the similar image; and
when the host determines that there is no image identical or similar to the first image based on the information for determining the storage method of the first image, storing the first image in the memory system.

14. The image backup method of claim 13, further comprising, when the host determines that there is the similar image or that there is no image identical or similar to the first image, storing the perceptual hash value of the first image in the host and storing the cryptographic hash value of the first image in the memory system.

15. A computing system comprising:
a host; and
a memory system provided separately from and communicatively coupled to the host, the memory system configured to store a plurality of images,
wherein the host is configured to calculate, by a perceptual hash engine of the host, a perceptual hash value of a first image by applying a perceptual hash function to the first image, perform a similarity determination between the first image and the plurality of images by comparing the calculated perceptual hash value with perceptual hash values of the plurality of images, and provide the first image to the memory system when a result of the similarity determination is identical or similar, and
the memory system is configured to receive the first image from the host when the result of the similarity determination is identical or similar, calculate, by a cryptographic hash engine of the memory system, a cryptographic hash value of the first image by applying a cryptographic hash function to the first image, perform an identity determination between the first image and the plurality of images by comparing the calculated cryptographic hash value with cryptographic hash values of the plurality of images, and provide the host with information for determining a storage method of the first image based on a result of the identity determination,
wherein when a number of different bits between the perceptual hash value of the first image and perceptual hash values of the plurality of images is less than or equal to a threshold number, determining that there is an image among the plurality of images that is identical or similar to the first image; and
when the number of different bits is not less than or equal to the threshold number, determining that there is no image among the plurality of images that is identical or similar to the first image.

16. The computing system of claim 15, wherein the memory system comprises:
a first memory system configured to store a first plurality of images; and
a second memory system configured to store a second plurality of images, and
wherein the host is configured to identify a similar image that is similar to the first image from among the first plurality of images and the second plurality of images, based on the perceptual hash function, and provide the first image to the first memory system or the second memory system in which the similar image is stored.

17. The computing system of claim 16, wherein, in response to receiving the information for determining the storage method of the first image from each of the first memory system and the second memory system, the host is configured to store at least a portion of the first image in at least one of the first memory system and the second memory system, based on the information for determining the storage method of the first image.

18. A memory system comprising:
a memory device configured to store a plurality of images; and
a memory controller configured to apply, by a perceptual hash engine, a perceptual hash function to an entirety of a first pixel image to be backed up to generate a perceptual hash value, the first pixel image being received from a host provided separately from and communicatively coupled to the memory system, perform a similarity determination between the entirety of the first pixel image and the plurality of images based on the perceptual hash value of the first pixel image, apply, by a cryptographic hash engine, a cryptographic hash function to the entirety of the first pixel image to generate a cryptographic hash value, perform, when the result of the similarity determination is identical or similar, an identity determination between the entirety of the first pixel image and the plurality of images based on the cryptographic hash value, and provide results of the similarity determination and the identity determination to the host,
wherein when a number of different bits between the perceptual hash value of the first pixel image and perceptual hash values of the plurality of images is less than or equal to a threshold number, determining that there is an image among the plurality of images that is identical or similar to the first pixel image; and
when the number of different bits is not less than or equal to the threshold number, determining that there is no image among the plurality of images that is identical or similar to the first pixel image.

* * * * *